United States Patent [19]
Nilsson

[11] 3,881,787
[45] May 6, 1975

[54] BALL BUSHING

[75] Inventor: Sven Walter Nilsson, Partille, Sweden

[73] Assignee: SKF Industrial Trading and Development Company, B.V., Jutphaas, Netherlands

[22] Filed: Feb. 12, 1973

[21] Appl. No.: 331,515

[30] Foreign Application Priority Data
Feb. 14, 1972 Sweden................................ 1715/72

[52] U.S. Cl................................................. 308/6 C
[51] Int. Cl. ............................................. F16c 17/00
[58] Field of Search .................................... 308/6 C

[56] References Cited
UNITED STATES PATENTS

| | | | |
|---|---|---|---|
| 2,452,117 | 10/1948 | Ferger................... | 308/6 C |
| 2,509,749 | 5/1950 | Thomson ............... | 308/6 C |
| 2,576,269 | 11/1951 | Thomson ............... | 308/6 C |
| 2,908,152 | 10/1959 | Anderson............... | 308/6 C |
| 3,037,821 | 6/1962 | Schutz.................... | 308/6 C |
| 3,330,606 | 7/1967 | Suda ...................... | 308/6 C |
| 3,357,754 | 12/1967 | Betrix..................... | 308/6 C |
| 3,464,745 | 9/1969 | Schaeffler ............. | 308/6 C |
| 3,689,124 | 9/1972 | Irwin...................... | 308/6 C |

*Primary Examiner*—Charles J. Myhre
*Assistant Examiner*—R. H. Lazarus
*Attorney, Agent, or Firm*—Howson and Howson

[57] ABSTRACT

An improved ball bushing assembly comprising a shaft and elongated tubular sleeve adapted for longitudinal movement relative to one another wherein the sleeve circumscribes the shaft in spaced relation therefrom to define an annular space for a plurality of ball elements. The assembly includes a cage for guiding the ball elements comprising a pair of cage sections each including an annular member having a plurality of axially directed fingers. The fingers of each cage section are interdigitated so as to form a continuous ball path for the ball elements about the periphery of the shaft. Means is provided on the inner surface of the sleeve confronting the peripheral surface of the shaft defining a series of axially extending circumferentially spaced grooves having a cross sectional radium of curvature conforming closely to the radius of curvature of the ball elements to obtain good osculation therebetween. The grooves of a first series are recessed deeper into the sleeve than the grooves of the second series disposed intermediate the first series. The cage fingers are of a predetermined configuration with respect to the ball elements and the shaft so that the ball elements are in bearing contact with the shaft and sleeve when disposed in the second groove series and move in one direction during relative movement of the shaft and sleeve and are free to rotate without contacting both the sleeve and shaft and move in the first groove series in a direction opposite movement in the second groove series.

7 Claims, 7 Drawing Figures

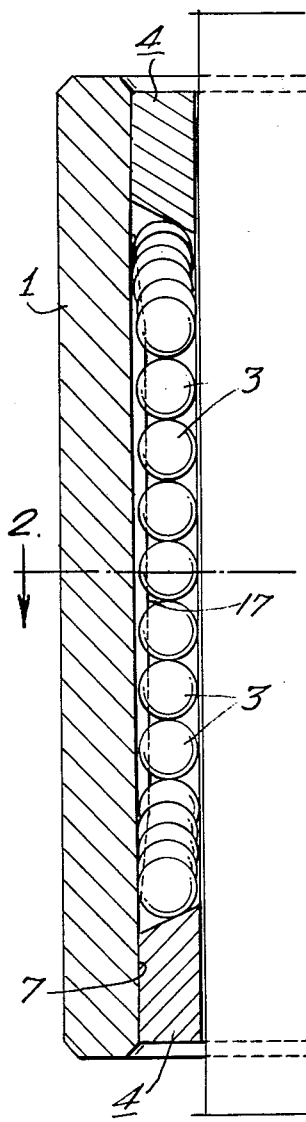
FIG.1.
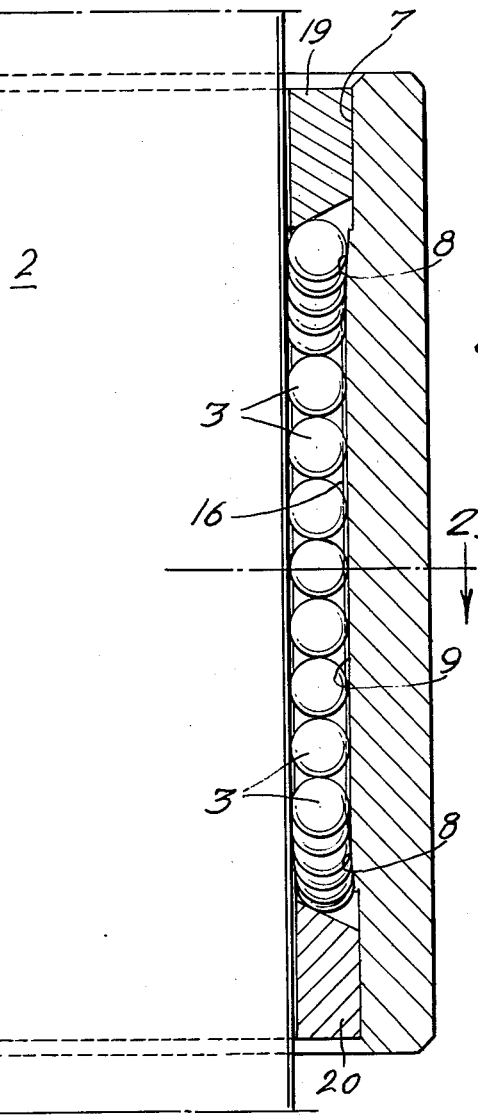
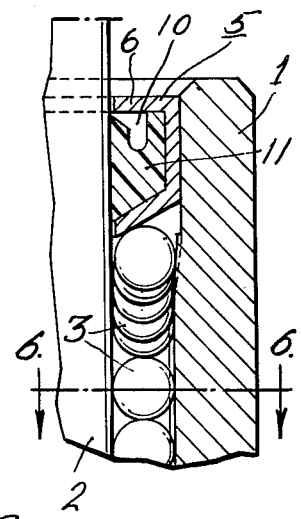
FIG.5.
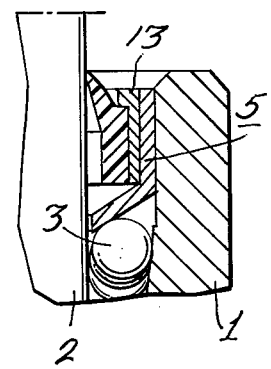
FIG.7.
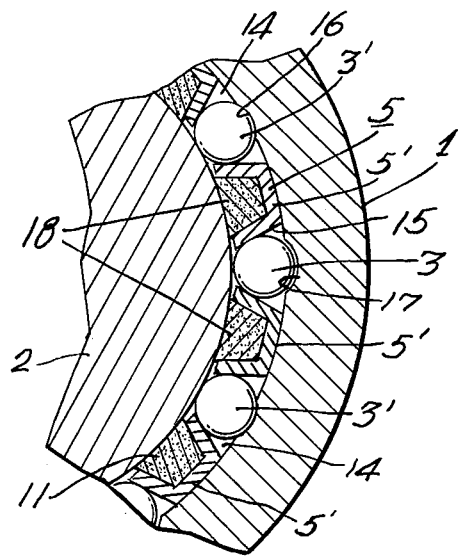
FIG.6.

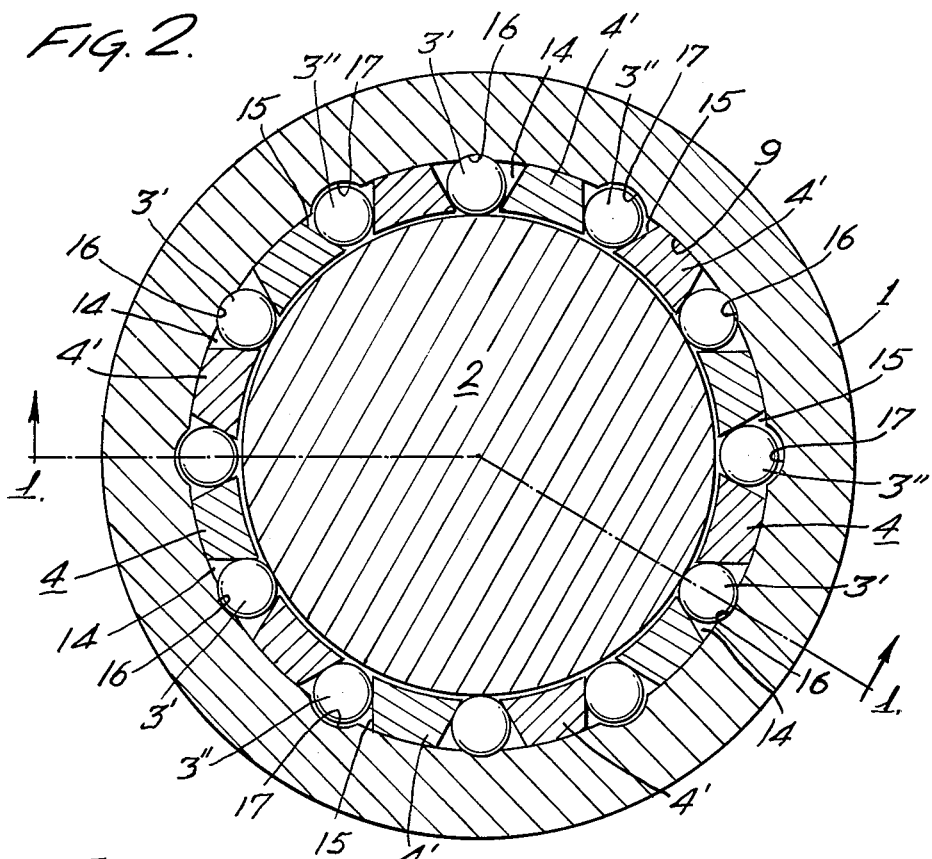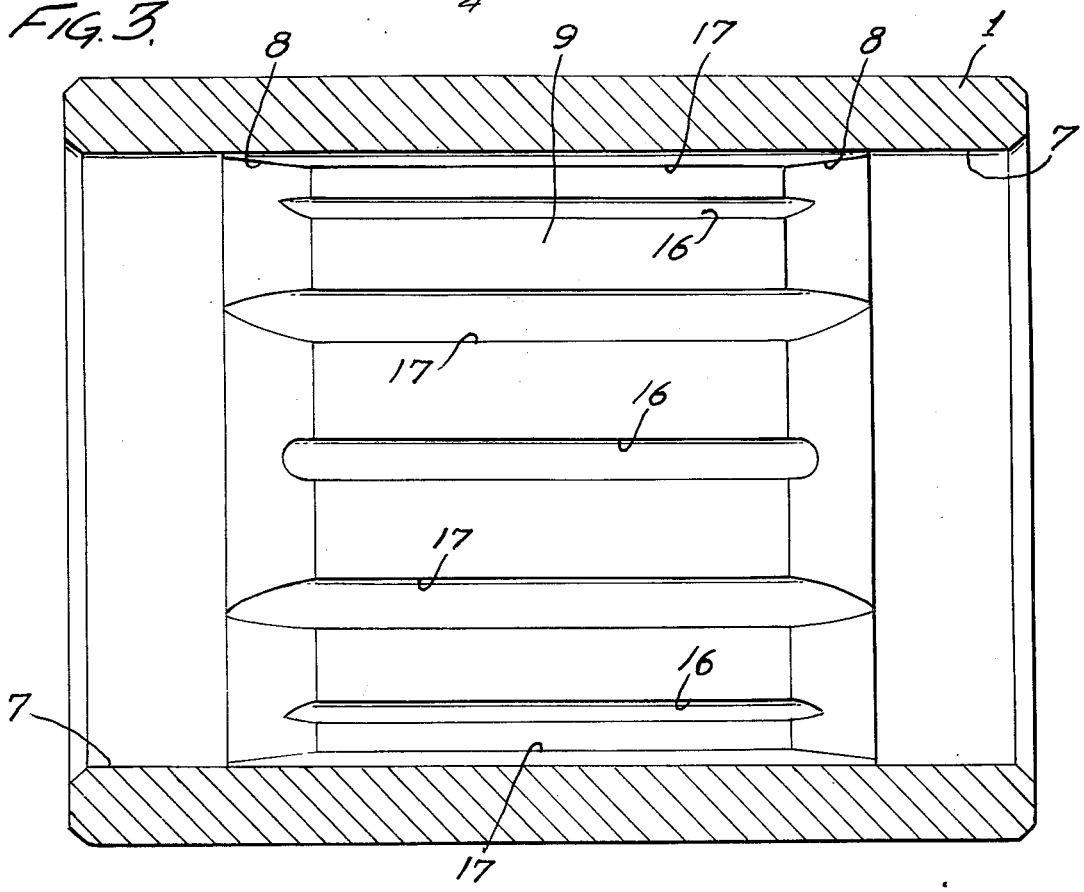

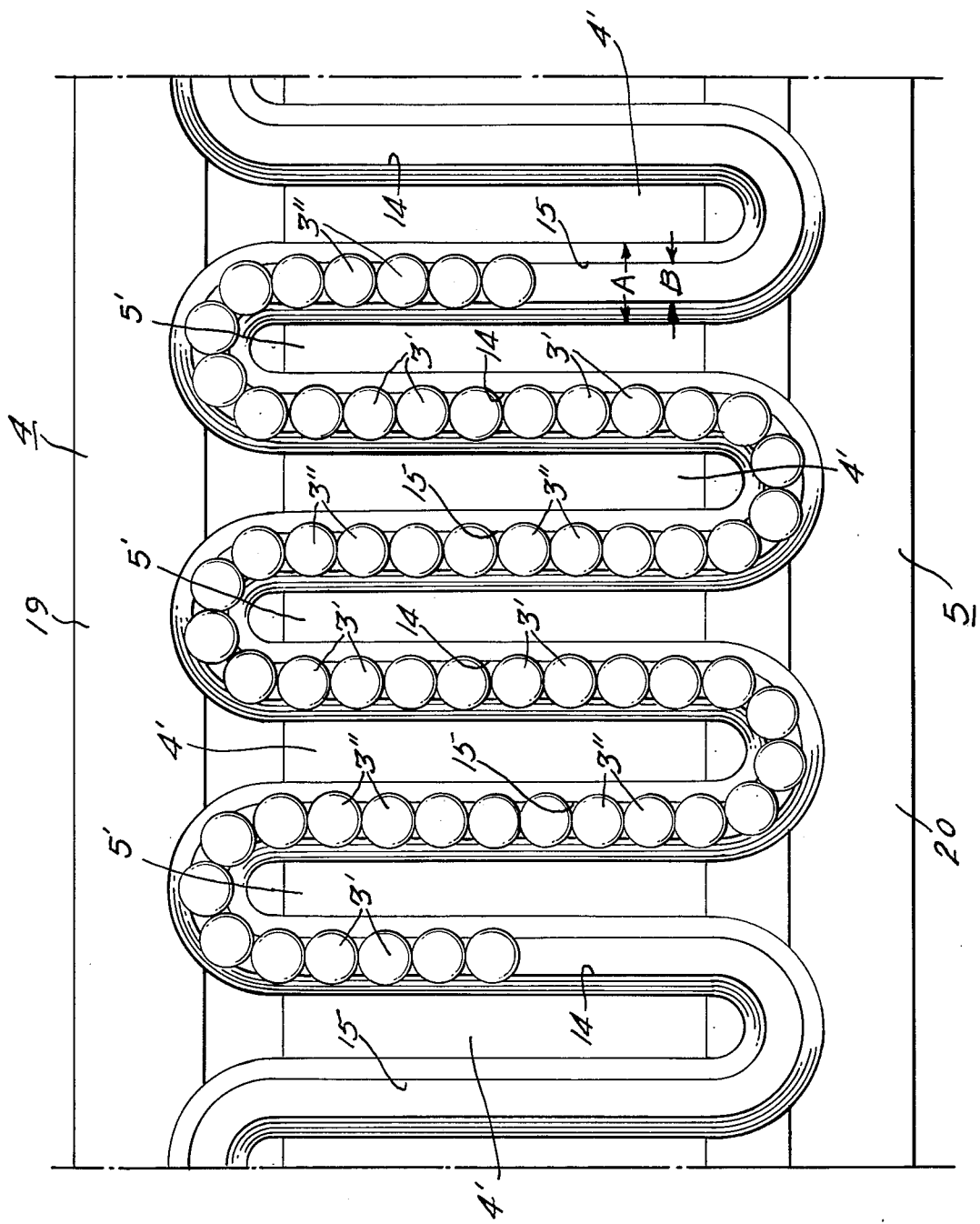

BALL BUSHING

SUMMARY OF THE INVENTION

The present invention relates to a ball bushing of the type comprising a sleeve and a shaft and balls between the shaft and the sleeve, the balls being guided by a cage. This cage consists of two halves insertable into each other and comprises two annular end parts having fingers protruding therefrom. When the two halves are inserted into each other, ball grooves for guiding the balls are formed.

The invention relates primarily to the shape of the sleeve combined with the construction of the cage, and the invention is mainly characterized in that at the inner surface of the sleeve a number of longitudinal grooves are arranged, every second of the grooves having a radius of such a size that the balls, when being loaded, are in contact with both the sleeve and the shaft, while the other grooves between these grooves have such a large radius or such a large diameter to the groove bottom that the balls are not loaded, and that the cage is so shaped that the openings of the ball grooves between the fingers and towards the sleeve have a size greater than the ball diameter, while the openings towards the shaft have a smaller width than the ball diameter.

The advantages of the ball bushing according to the invention are many compared with those at present existing. By giving every second of the longitudinal grooves at the inner surface of the sleeve a radius so dimensioned that a good osculation to the ball is obtained, the balls in these rows will be guided correctly making the forces on the cage less and accordingly reduced wear. Due to the good osculation to the ball even the loading capacity will increase. The shape of the cage will bring the balls to run in a continuous track, so that the balls will get a radial indexing when the bushing moves along the shaft.

A certain guidance of the unloaded, re-circulating balls will also be obtained by a special choice of the groove radius and the diameter of the groove bottom.

BRIEF DESCRIPTION OF THE FIGURES

The invention will be described in further detail in connection with the attached drawings on which FIG. 1 is a longitudinal view of a ball bushing in accordance with the present invention;

FIG. 2 is a transverse sectional view taken along lines 2—2 of FIG. 1;

FIG. 3 is a longitudinal sectional view taken through the sleeve;

FIG. 4 is an exploded view of the cage;

FIG. 5 is a fragmentary sectional view showing another embodiment of cage in accordance with the present invention;

FIG. 6 is an enlarged fragmentary sectional view taken on lines 6—6 of FIG. 5; and FIG. 7 is a fragmentary view showing a modified form of friction seal at the axial ends of the cage.

DESCRIPTION OF SPECIFIC EMBODIMENTS

The main parts of the ball bushing are the sleeve 1, the shaft 2, the balls 3 and the cage 4,5, as appears from the FIGS. 1 2,5, and 6.

A cage 5 made of pressed sheet metal, plastic or the like is shown in FIGS. 5 and 6 and a solid cage 4 is shown in FIG. 1. In the former embodiment the cage has been bent inwards at its end parts, so that a gable 6 protecting against dirt is obtained. The cylindrical part at this end of the cage rests in a cylindrical surface 7 in the sleeve. The sleeve has a conical surface at 8 and a longer cylindrical surface at the central part 9. These surfaces will be described below. To improve the sealing effect a friction seal 11 of plastic, rubber or the like has been arranged in the space 10 at the end part of the cage 5.

Another embodiment of this is shown in FIG. 7, where the cage is open towards the end but instead the lip of the friction seal has been arranged flush with the edge line of the sleeve. To fasten the soft sealing part it has been inserted into a thin rigid sleeve 13. By arranging this seal inside the sleeve that advantage is attained that it will be protected against outside damage. In connection with the solid embodiment it is also possible to arrange a seal in a cavity in the cage, but It is also possible to use an external seal situated outside the sleeve.

In FIGS. 2 and 6 the cage is shown in cross section, FIG. 6 illustrating the cage made of sheet metal or plastic, and FIG. 2 showing it in solid embodiment. The ball grooves made between the fingers 4,5 of the cage have been denoted with 14, 15. The openings of the grooves towards the sleeve 1 have a width A greater than the ball diameter, while the width B at the openings towards the shaft is less than the ball diameter. By making the ball grooves in this way they are prevented from falling out of the cage when the bushing is in dismounted stage. In the embodiment shown the ball grooves have been furnished with plane side surfaces having a certain inclination with regard to a plane perpendicular to the shaft centre. These surfaces may also be made convex or concave but also completely straight and parallel. The straight side planes may be furnished at the openings towards the shaft side with strip-like extensions so that the smaller width mentioned above is obtained at this place. When the bushing is moved along the shaft 2, the balls 3' will run in one direction in their ball grooves 14 in the cage 4,5, and the balls denoted with 3'' will be reversed in the opposite direction in their ball grooves 15. The above mentioned guidance of the balls 3' in the loaded row is obtained therethrough that the balls are contacting grooves 16 in the sleeve 1. These grooves have a radius substantially equal to that of the balls so that a good osculation between the balls and the groove is obtained in the loaded state. By returning the balls denoted 3'' these will in an unloaded condition run in their grooves 15 with a certain free running to grooves 17 in the sleeve straight opposite these ball rows. The radii of the grooves are larger than those of the balls, or the groove bottoms are arranged along a diameter larger than the diameter on which the bottoms of the above mentioned grooves lie. Through this embodiment one also here obtains a certain guidance of the balls.

In the embodiment of the cage shown in FIG. 6, i.e., the one made from sheet metal or plastic denoted 5 one may fill the spaces within the fingers with grease of suitable consistency or grease-absorbing material 18, for instance plastic, felt or the like saturated with oil. Through such an arrangement grease is retained in the ball bushing and is transported by means of the movement of the balls from loaded to unloaded rows. By means of the seals described above the grease will be retained within the bushing.

In FIG. 4 a cage 4,5 is shown with its two halves in an exploded view. The halves consist of annular end parts 19, 20 with therefrom protruding fingers 4', 5'. When the halves have been inserted into each other, the ball grooves 14, 15 are formed between the fingers. The balls are guided in these grooves when the bushing is moved along the shaft.

FIG. 3 shows a longitudinal section of the interior of the sleeve 1. As mentioned above two cylindrical surfaces 7 are arranged at the ends of the sleeve in which annular end parts of the cage 4,5 rest. Adjacent these surfaces are conical surfaces 8. At these surfaces the loaded balls turn when they arrive into the semicircular parts of the ball grooves to be returned in an unloaded condition, and vice versa at the other side of the other end of the cage. The longer surface at the central part of the sleeve is cylindrical and in this the above mentioned longitudinal grooves 16, 17, has been made. Their function has been described above.

The invention is not limited to the above mentioned embodiment examples but can be varied in different ways within the scope of the claims.

I claim:

1. The combination comprising a shaft member, and an elongated tubular sleeve member adapted for longitudinal movement relative to one another, said sleeve member circumscribing said shaft member, and spaced therefrom to define an annular space therebetween, a plurality of ball elements in the annular space between said shaft member and sleeve member and a cage for guiding said ball elements comprising first and second cage sections each including an annular portion having a plurality of axially directed fingers, the fingers of each cage section being interdigitated so as to form a continuous ball path for the ball elements about the periphery of the shaft member, the circumferential distance between confronting side walls of adjacent fingers being larger than the diameter of the balls when measured adjacent the sleeve member but smaller than the diameter of the balls when measured adjacent the shaft member, means defining on the inner surface of said sleeve member confronting the peripheral surface of said shaft member, a series of axially extending, circumferentially spaced grooves having a cross sectional radius of curvature conforming closely to the radius of curvature of the ball elements to obtain good osculation therebetween, the grooves of a first series being recessed deeper into said sleeve member than the grooves of a second series disposed intermediate said first series and the cage fingers being of a predetermined configuration with respect to the ball elements and the shaft member so that the ball elements are in bearing contact with the shaft member and sleeve member when in said second groove series and move in one direction during relative movement of said shaft member and sleeve member and are free to rotate without contacting both the sleeve member and shaft member when in said first groove series and move in said first groove series in a direction opposite movement in said second groove series.

2. A ball bushing as claimed in claim 1 wherein confronting walls of adjacent fingers taper radially inwardly.

3. The combination comprising a shaft member, and an elongated tubular sleeve member adapted for longitudinal movement relative to one another, said sleeve member circumscribing said shaft member, and spaced therefrom to define an annular space therebetween, a plurality of ball elements in the annular space between said shaft member and sleeve member and a cage for guiding said ball elements comprising first and second cage sections each including an annular portion having a plurality of axially directed fingers, the fingers of each cage section being interdigitated so as to form a continuous ball path for the ball elements about the periphery of the shaft member, means defining on the inner surface of said sleeve member confronting the peripheral surface of said shaft member, a series of axially extending, circumferentially spaced grooves having a cross sectional radius of curvature conforming closely to the radius of curvature of the ball elements to obtain good osculation therebetween, the grooves of a first series being recessed deeper into said sleeve member than the grooves of a second series disposed intermediate said first series and the cage fingers being of a predetermined configuration with respect to the ball elements and the shaft member so that the ball elements are in bearing contact with the shaft member and sleeve member when in said second groove series and move in one direction during relative movement of said shaft member and sleeve member and are free to rotate without contacting both the sleeve member and shaft member when in said first groove series and move in said first groove series in a direction opposite movement in said second groove series, the radially inner surface of the sleeve member comprising a cylindrical surface at each axial end of which the annular members of the cage are disposed, an inclined surface contiguous with each cylindrical surface and a further cylindrical surface spanning both inclined surfaces, the grooves in the sleeve member extending between the inclined surfaces.

4. The combination comprising a shaft member, and an elongated tubular sleeve member adapted for longitudinal movement relative to one another, said sleeve member circumscribing said shaft member, and spaced therefrom to define an annular space therebetween, a plurality of ball elements in the annular space between said shaft member and sleeve member and a cage for guiding the ball elements made from a sheet material and comprising first and second cage sections each including an annular portion formed to provide a radially inwardly extending annulus and having a plurality of axially directed fingers, the fingers of each cage section being interdigitated so as to form a continuous ball path for the ball elements about the periphery of the shaft member, means defining on the inner surface of said sleeve member confronting the peripheral surface of said shaft member, a series of axially extending, circumferentially spaced grooves having a cross sectional radius of curvature conforming closely to the radius of curvature of the ball elements to obtain good osculation therebetween, the grooves of a first series being recessed deeper into said sleeve member than the grooves of a second series disposed intermediate said first series and the cage fingers being of a predetermined configuration with respect to the ball elements and the shaft member so that the ball elements are in bearing contact with the shaft member and sleeve member when in said second groove series and move in one direction during relative movement of said shaft member and sleeve member and are free to rotate without contacting both the sleeve member and shaft member when in said first groove series and move in said first groove series in a direction opposite movement in said second groove series.

5. The combination comprising a shaft member, and an elongated tubular sleeve member adapted for longitudinal movement relative to one another, said sleeve member circumscribing said shaft member, and spaced therefrom to define an annular space therebetween, a plurality of ball elements in the annular space between said shaft member and sleeve member and a cage for guiding said ball elements made from a sheet material and comprising first and second cage sections each including an annular portion having a plurality of axially directed fingers, the fingers of each cage section being interdigitated so as to form a continuous ball path for the ball elements about the periphery of the shaft member, a lubricant absorbing material disposed internally of the cage fingers confronting and in engagement with said shaft member, means defining on the inner surface of said sleeve member confronting the peripheral surface of said shaft, a series of axially extending, circumferentially spaced grooves having a cross sectional radius of curvature conforming closely to the radius of curvature of the ball elements to obtain good osculation therebetween, the grooves of a first series being recessed deeper into said sleeve member than the grooves of a second series disposed intermediate said first series and the cage fingers being of a predetermined configuration with respect to the ball elements and the shaft member so that the ball elements are in bearing contact with the shaft member and sleeve member when in said second groove series and move in one direction during relative movement of said shaft member and sleeve member and are free to rotate without contacting both the sleeve member and shaft member when in said first groove series and move in said first groove series in a direction opposite movement in said second groove series.

6. A ball bushing as claimed in claim 1 wherein the axial ends of the cage are formed to provide a radially inwardly extending annulus opening axially outwardly and including a seal supported in a rigid sleeve mounted in the open end of said annular portion and having a lip disposed flush with the edge line of the sleeve member.

7. A ball bushing as claimed in claim 4, wherein the annulus defines an annular pocket, a friction seal being mounted in the pocket and engaging the shaft member.

* * * * *